United States Patent
Krivenok et al.

(10) Patent No.: US 10,146,574 B1
(45) Date of Patent: Dec. 4, 2018

(54) TECHNIQUES FOR SCHEDULING STORAGE OPERATIONS ON VIRTUAL DISKS OF A VIRTUAL MACHINE

(71) Applicant: EMC IP Holding Company LLC, Hopkinton, MA (US)

(72) Inventors: Dmitry Vladimirovich Krivenok, Saint-Petersburg (RU); Yuri A. Stotski, Saint-Petersburg (RU); Derek M. Scott, Raleigh, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 326 days.

(21) Appl. No.: 15/195,447

(22) Filed: Jun. 28, 2016

(51) Int. Cl.
*G06F 9/455* (2018.01)
*G06F 9/48* (2006.01)
*G06F 3/06* (2006.01)

(52) U.S. Cl.
CPC ............ *G06F 9/4881* (2013.01); *G06F 3/061* (2013.01); *G06F 3/067* (2013.01); *G06F 3/0659* (2013.01); *G06F 3/0664* (2013.01); *G06F 9/45558* (2013.01); *G06F 2009/45583* (2013.01); *G06F 2009/45595* (2013.01)

(58) Field of Classification Search
CPC .. G06F 9/4881; G06F 9/0659; G06F 9/45558; G06F 9/0664; G06F 9/061; G06F 9/067
See application file for complete search history.

(56) References Cited

U.S. PATENT DOCUMENTS

| 6,549,934 B1 * | 4/2003 | Peterson ................. H04L 49/90 709/203 |
| 8,959,249 B1 | 2/2015 | Love |
| 9,032,399 B1 | 5/2015 | Yang et al. |
| 2007/0233952 A1 * | 10/2007 | Tanaka ................... G06F 3/0605 711/114 |

(Continued)

FOREIGN PATENT DOCUMENTS

WO 2017171575 A1 10/2017

OTHER PUBLICATIONS

Wikipedia; "Completely Fair Scheduler," May 2016, <https://en.wikipedia.org/w/index.php?title=Completely_Fair_Scheduler&oldid=721908086>, 4 pages.

(Continued)

*Primary Examiner* — Emerson C Puente
*Assistant Examiner* — Zhi Chen
(74) *Attorney, Agent, or Firm* — BainwoodHuang

(57) ABSTRACT

A method, of scheduling storage commands for processing on a virtual machine (VM) operating on a computing device includes (a) intercepting, by a front end storage scheduler module running on the VM, a set of storage commands each of which is directed at one of a plurality of virtual disks assigned to the VM, the plurality of virtual disks sharing underlying storage, (b) queueing the intercepted storage commands for each virtual disk into a respective front-end queue for each virtual disk, and (c) selectively dequeueing storage commands from the front-end queues onto their respective virtual disks in a manner that prioritizes certain (Continued)

virtual disks over others, wherein the selectively dequeueing is performed in a different order than the queueing. An apparatus, system, and computer program product for performing a similar method are also provided.

12 Claims, 4 Drawing Sheets

(56) References Cited

U.S. PATENT DOCUMENTS

| | | | | |
|---|---|---|---|---|
| 2008/0313403 | A1* | 12/2008 | Niranjan | G06F 3/061 |
| | | | | 711/120 |
| 2011/0153985 | A1* | 6/2011 | Saha | G06F 21/602 |
| | | | | 712/42 |
| 2016/0142333 | A1* | 5/2016 | Panchagnula | H04L 47/6295 |
| | | | | 370/412 |

OTHER PUBLICATIONS

Wikipedia; "Noop Scheduler," Mar. 2016, <https://en.wikipedia.org/w/index.php?title=Noop_scheduler&oldid=712646696>, 3 pages.
Wikipedia; "Deadline Scheduler," Mar. 2016, <https://en.wikipedia.org/w/index.php?title=Deadline_scheduler&oldid=708142597>, 3 pages.

* cited by examiner

TECHNIQUES FOR SCHEDULING STORAGE OPERATIONS ON VIRTUAL DISKS OF A VIRTUAL MACHINE

BACKGROUND

Storage operations scheduled by different processes or different groups of processes running on a system may have different relative priorities. Thus, the Linux kernel implements a CFQ storage scheduler, which allows storage commands issued to a disk to be scheduled so as to prioritize storage commands coming from higher priority processes and groups of processes. This scheme uses blkio shares assigned to particular groups of processes in association with particular disks as well as ionice values assigned to particular processes to prioritize storage commands received by the CFQ storage scheduler for each disk.

SUMMARY

Unfortunately, the above-described techniques may suffer from deficiencies in a virtualized context. For example, virtualized storage appliances allow virtual machines (VMs) running on a hypervisor of a server to process storage operations directed at virtual disks. Since it is common for most or all virtual disks available to a VM to be provisioned from a common pool of underlying storage, even if storage commands directed at each virtual disk are scheduled using the CFQ scheduler, because all of the virtual disks must contend for the same underlying storage resources, there will still be much storage resource contention between the schedulers for the various virtual disks, thereby thwarting much of the benefit of the scheduling. In addition, although it is possible to evenly allocate access to storage resources between several VMs running on a set of hypervisors (e.g., VMWare SIOC), that approach does not improve scheduling within a single VM.

Thus, it would be desirable to implement a scheme to schedule storage operations to different virtual disks within a single VM that share underlying storage in a manner that effectively reduces resource contention. This may be done by implementing a front-end storage scheduler for the entire VM that dequeues storage operations between the various virtual disks in a scheduled manner. In some embodiments, this scheme allows weighted prioritization of storage commands to particular virtual disks or groups of virtual disks.

In one embodiment, a method of scheduling storage commands for processing on a virtual machine (VM) operating on a computing device is performed. The method includes (a) intercepting, by a front end storage scheduler module running on the VM, a set of storage commands each of which is directed at one of a plurality of virtual disks assigned to the VM, the plurality of virtual disks sharing underlying storage, (b) queueing the intercepted storage commands for each virtual disk into a respective front-end queue for each virtual disk, and (c) selectively dequeueing storage commands from the front-end queues onto their respective virtual disks in a manner that prioritizes certain virtual disks over others, wherein the selectively dequeueing is performed in a different order than the queueing. An apparatus, system, and computer program product for performing a similar method are also provided.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Embodiments are directed to techniques for scheduling storage operations to different virtual disks within a single virtual machine (VM) that share underlying storage in a manner that effectively reduces resource contention. This may be done by implementing a front-end storage scheduler for the entire VM that dequeues storage operations between the various virtual disks in a scheduled manner. In some embodiments, this scheme allows weighted prioritization of storage commands to particular virtual disks or groups of virtual disks.

Figure 1:
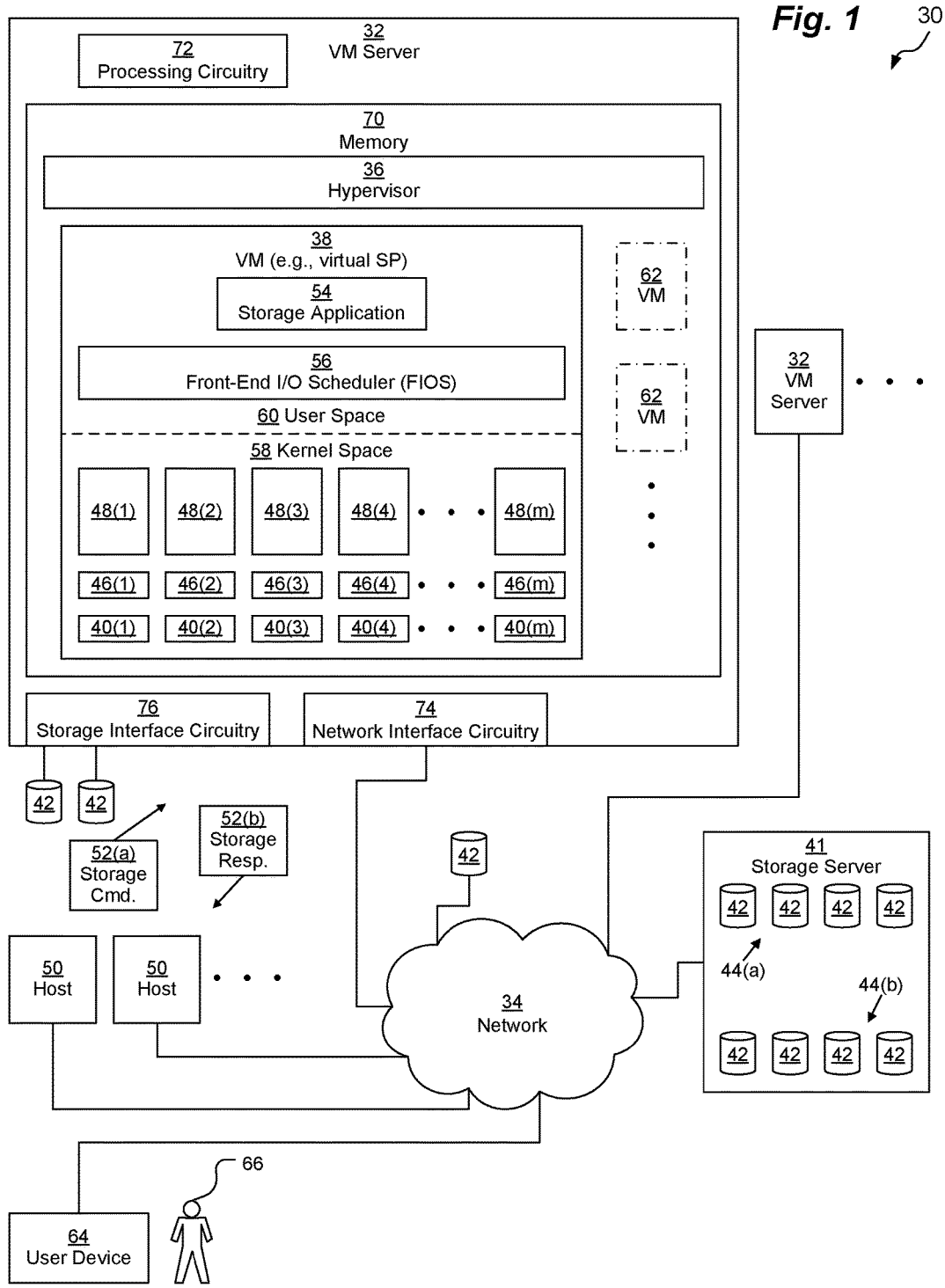
FIG. 1 is a block diagram depicting an example system and apparatus for use in connection with various embodiments.

FIG. 1 depicts a system 30. System 30 includes one or more VM servers 32 connected to a network 34. Network 34 may be any kind of communication network, such as a storage area network (SAN), local area network (LAN), wide area network (WAN), cellular data network, wireless network, interconnected fabric of point-to-point connections, etc.

VM servers 32 are configured to each run a hypervisor 36. Each hypervisor 36 is configured to allow various VMs 38, 62 to execute on its respective VM server 32, as is well-known in the art. Thus, hypervisor 36 presents a virtual operating platform on which VMs 38, 62 may run.

VM 38 may be, for example, a virtual storage processor (SP), which is configured to present access to a set of virtual disks 40 (depicted as virtual disks 40(1), 40(2), 40(3), 40(4), . . . , 40(m)) to hosts 50. Each virtual disk 40 is backed by physical storage from one or more disks 42 (which may be internal to a VM server 32; attached externally to a VM server 32; or attached directly to the network 34, e.g., network-attached storage) or RAID groups 44 (depicted as RAID groups 44(a), 44(b) on storage server 41, also connected to network 34). Typically, most or all of the virtual disks 40 are backed by storage from the same disks 42, RAID group 44, or set of RAID groups 44. The virtual disks 40 are all logically created and presented to the VM 38 by hypervisor 36.

A host 50 may be any kind of computing device configured to operate on a network, such as, for example, personal computers, workstations, server computers, enterprise servers, laptop computers, tablet computers, smart phones, mobile computers, etc. or combinations thereof. Typically, a host 50 is a server computer or an enterprise server. Hosts 50 issue data storage commands 52(a) and receive data storage responses 52(b) from data storage systems or virtual SPs (e.g., VM 38) in order to read from and write to virtual disks 40. Access to each virtual disk 40 is managed by a respective storage driver 46 (depicted as storage drivers 46(1), 46(2), 46(3), 46(4), . . . , 46(m)). Storage commands 52(a) directed at each virtual disk 40 are scheduled for processing by a respective storage scheduler 48 (depicted as storage schedulers 48(1), 48(2), 48(3), 48(4), . . . , 48(m)). Example storage schedulers 48 are depicted in further detail below in FIG. 2.

When a host 50 issues a storage command 52(a) directed at a particular virtual disk 40(x), the storage command 52(a) is processed by a storage application 54 executing within user space 60 of an operating system (not depicted) of VM 38. Storage application 54 sends the storage command 52(a) down a storage stack (not depicted) by sending it to a front-end input/output (I/O) scheduler (FIOS) 56, which is a software module also executing within user space 60 (although, in some embodiments, FIOS 56 may execute partially or fully within kernel space 58). An example FIOS 56 is depicted in further detail below in FIG. 2. In operation, FIOS 56 queues a set of storage commands 52(a) and dequeues them to the appropriate storage schedulers 48 in a scheduled manner, distributing the dequeueing among the various storage schedulers 48 in a manner consistent with weights for the various virtual disks 40. Thus, for example, if virtual disk 40(1) has a weight of 500 and virtual disk 40(4) has a weight of 5, if 1,000 storage commands 52(a) directed at virtual disk 40(1) and another 1,000 storage commands 52(a) directed at virtual disk 40(4) within a short window of time (e.g., 100 milliseconds), these 2,000 storage commands 52(a) will be queued within FIOS 56, and FIOS 56 may subsequently dequeue all 1,000 storage commands 52(a) directed at virtual disk 40(1) while only dequeueing 10 of the storage commands 52(a) directed at virtual disk 40(4), the remaining 990 storage commands 52(a) directed at virtual disk 40(4) to be dequeued at a later time.

Upon being dequeued into the storage schedulers 48, the storage commands 52(a) are again scheduled for dequeueing by the storage schedulers 48 individually, at which point, the respective storage drivers 46 execute the dequeued storage commands 52(a) with respect to the respective virtual disks 40, returning storage responses 52(b) back up the stack, ultimately towards the host 50 that initially issued the respective storage command 52(a). The storage responses 52(b) have a type corresponding to the initial storage commands 52(a). For example, if a storage command 52(a) is a write command, the corresponding storage response 52(b) will typically be a write confirmation or write failure response. As another example, if a storage command 52(a) is a read command, the corresponding storage response 52(b) will typically include data read from a virtual disk 40 or indicate failure. In some cases, the hosts 50 issue the storage commands 52(a) in response to input from users 66 operating user devices 64 across network 34, although, in other cases, the hosts 50 may operate without control by users 66.

Although FIOS 56 may operate (depending on the embodiment) within user space 60, storage schedulers 48 and storage drivers 46 operate within kernel space 58 of the operating system of VM 38.

VM servers 32 may be any kind of computing devices configured to operate on a network various VMs 38, 62 using a hypervisor 36, such as, for example, personal computers, workstations, server computers, enterprise servers, laptop computers, tablet computers, smart phones, mobile computers, etc. or combinations thereof. Typically, a VM server 32 is a server computer or an enterprise server running a hypervisor 36 such as ESXi provided by VMware, Inc. of Palo Alto, Calif. A VM server 32 includes memory 70, processing circuitry 72, and network interface circuitry 74. VM server 32 may also include storage interface circuitry 76 for controlling and communicating with disks 42. Disks 42 may be any kind of persistent storage devices, such as, for example, hard disk drives, solid-state storage devices, flash drives, etc. Storage interface circuitry 76 may include, for example, a SCSI, SAS, ATA, SATA, Fibre Channel (FC), or other similar controller and ports. VM server 32 may also include user interface circuitry and various other components as are well-known in the art.

Processing circuitry 72 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 74 may include one or more Ethernet cards, cellular modems, FC adapters, Wireless Fidelity (Wi-Fi) wireless networking adapters, and other devices for connecting to a network, such as network 34. Network interface circuitry 74 may be able to communicate with other VM servers 32, hosts 50, storage server 41, and user device 64.

Memory 70 may be any kind of digital system memory, such as, for example, random access memory (RAM). Memory 70 stores one or more operating systems in operation (not depicted, e.g., Linux, UNIX, Windows, MacOS, or a similar operating system), various applications executing on processing circuitry 72 (e.g., storage application 54, FIOS 56, and their component modules, etc.) as well as data used by those applications.

In some embodiments, memory 70 may also include a persistent storage portion (not depicted). Persistent storage portion of memory 70 may be made up of one or more persistent storage devices, such as, for example, disks 42. Persistent storage of memory 70 is configured to store programs and data even while the VM server 32 is powered off. The OS (e.g., Linux, UNIX, Windows, or a similar operating system) and the applications (e.g., storage application 54, FIOS 56, and their component modules, etc.) are typically stored in persistent storage so that they may be loaded into a system portion of memory 70 from persistent storage upon a system restart. These applications, when stored in non-transient form either in the volatile portion of memory 70 or in persistent storage, form a computer program product. The processing circuitry 72 running one or more of these applications thus forms a specialized circuit constructed and arranged to carry out the various processes described herein.

Figure 2:
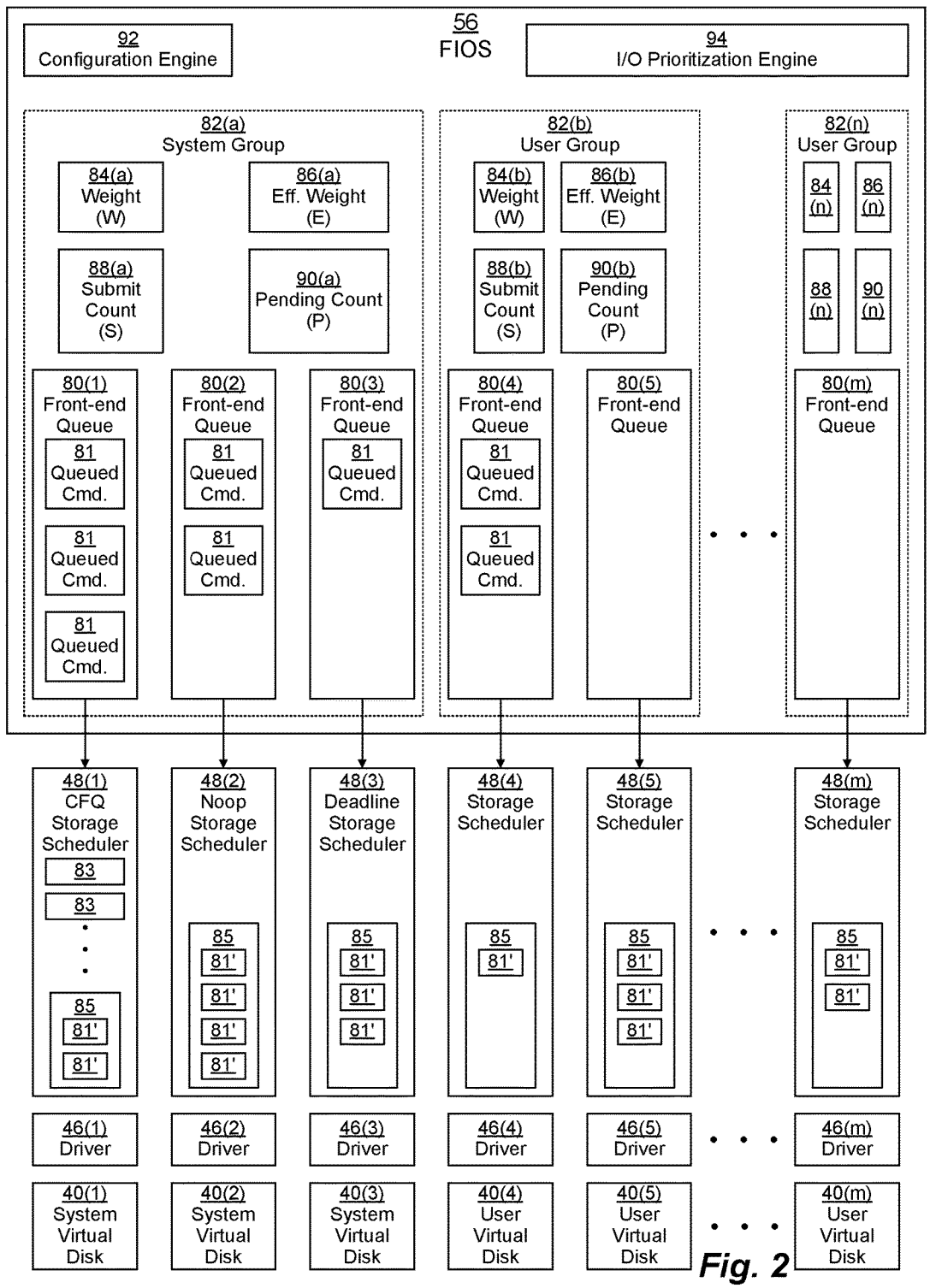
FIG. 2 is a block diagram depicting an example software module for use in connection with various embodiments.

FIG. 2 illustrates an example FIOS 56 in more detail as well as the respective storage schedulers 48, storage drivers 46, and virtual disks 40 to which FIOS 56 dequeues.

FIOS 56 includes two software modules, configuration engine 92 and I/O prioritization module 94. Configuration engine 92 serves to set up a front-end queue 80 (depicted as front-end queues 80(1), 80(2), 80(3), 80(4), 80(5), . . . , 80(m)) for each virtual disk 40 of the VM 38 and assign a weight to each front-end queue 80. In some embodiments (as depicted), rather than individually assigning a separate weight to each front-end queue 80, configuration engine 92 assigns each front-end queue 80 to a group 82 (depicted as system group 82(a), user group 82(b), . . . , user group 82(n)) and assigns a respective weight (W) 84 (depicted as weights 84(a), 84(b), . . . , 84(n)) to each group 82. In some embodiments, configuration engine 92 creates and assigns the groups 82 and weights 84 based on input from a user 66, while in other embodiments, configuration engine 92 creates and assigns the groups 82 and weights 84 based on static configuration rules. In yet other embodiments, configuration engine 92 dynamically creates and assigns the groups 82 and weights 84 using any known technique, including artificial intelligence and machine learning. In yet other embodiments, several of the above-mentioned embodiments may be combined. In some embodiments, as additional virtual disks 40 are added to the VM 38, configuration engine 92 is able to dynamically alter the assignments of groups 82 and weights 84. Configuration engine 92 may also initialize a respective effective weight 86 (depicted as effective weights 86(*a*), 86(*b*), . . . , 86(*n*)), submit count 88 (depicted as submit counts 88(*a*), 88(*b*), . . . , 88(*n*)), and pending count 90 (depicted as pending counts 90(*a*), 90(*b*), . . . , 90(*n*)) for each group 82. The effective weight 86(*y*) for a given group 82(*y*) may initially be set equal to the weight 84(*y*) for that group 82(*y*), while the submit counts 88 and pending counts 90 are all initially set to zero.

In some embodiments, a VM 38 may have a fixed number (e.g., three) of system virtual disks 40 (e.g., system virtual disks 40(1), 40(2), 40(3)) used for the operating system and other VM-related tasks and data, with any additional virtual disks 40 (e.g., user virtual disks 40(4), 40(5), 40(*m*)) assigned a user function, for example, for user data and application data. Typically, system virtual disks 40(1), 40(2), 40(3) require higher priority than user virtual disks 40(4), 40(5), . . . , 40(*m*). Thus, in some embodiments (as depicted), system virtual disks 40(1), 40(2), 40(3) are grouped together into a system group 82(*a*), having a highest relative weight 84(*a*), while the user virtual disks 40(4), 40(5), . . . , 40(*m*) are grouped into a set of user groups 82(*b*), . . . , 82(*n*) each having a respective weight 84(*b*), . . . , 84(*n*) that is lower than the highest weight 84(*a*). Thus, for example, weight 84(*a*) may be set to 500, while weight 84(*b*) is set to 100 and weight 84(*n*) is set to 75.

Once configuration engine 92 initializes the groups 82, weights 84, front-end queues 80, and assignments of virtual disks 40 to respective front-end queues 80 and assignments of front-end queues 80 to groups 82, I/O prioritization engine 94 is able to process incoming storage commands 52(*a*). Upon receiving a storage command 52(*a*) directed at a virtual disk 40(*x*), I/O prioritization engine 94 queues it into the front-end queue 80(*x*) for that virtual disk 40(*x*) as a queued command 81. Every time a new queued command 81 is added to a front-end queue 80 within a group 82(*y*), I/O prioritization engine 94 increments the pending count 90(*y*) (P++) for that group 82(*y*).

I/O prioritization engine 94 also dequeues the queued commands 81 from the various front-end queues 80 into their respective storage schedulers 48 in a scheduled prioritized manner (see below in connection with FIGS. 3 and 4). There are various types of storage schedulers 48 that may operate within kernel space 58 for the various virtual disks 40 as is well-known in the art. Thus, for example, virtual disk 40(1) is scheduled by a CFQ storage scheduler 48(1), which may include several per-process queues 83 as is well-known in the art, in order to implement per-process prioritization. Other types of storage schedulers 48 include Noop storage schedulers (e.g., Noop storage scheduler 48(2) which schedules for virtual disk 40(2)), and Deadline storage schedulers (e.g., Deadline storage scheduler 48(3) which schedules for virtual disk 40(3)). A typical storage scheduler 48 includes a back-end queue 85, which may include various queued storage commands 81' that have been received from a respective front-end queue 80. Each storage scheduler 48 is then able to dequeue these queued storage commands 81' by sending them to their respective storage drivers 46 for processing with respect to the respective virtual disk 40 as is well-known in the art. Although CFQ, Noop, and Deadline storage schedulers 48 are Linux-based, in other embodiments, VM 38 may run another OS having its own type or types of storage schedulers instead.

Every time I/O prioritization engine 94 dequeues a queued command 81 from its front-end queue 80 within a group 82(*y*), I/O prioritization engine 94 decrements the pending count 90(*y*) (P--) for that group 82(*y*) and increments the submit count 88(*y*) (S++) for that group 82(*y*). In some embodiments, once the submit count 88(*y*) for a group 82(*y*) equals or exceeds (depending on the embodiment) the effective weight 86(*y*) (which is initially equal to the weight 84(*y*)) for that group 82(*y*), I/O prioritization engine 94 increases the value of the effective weights 86 for all groups 82, typically by multiplying each effective weight 86 by a factor.

As depicted in FIG. 2, system group 82(*a*) has its pending count 90(*a*) equal to six since there are six queued commands 81 within the front-end queues 80(1), 80(2), 80(3) of that group 82(*a*). System group 82(*a*) also has a submit count 88(*a*) of at least nine, since there are currently nine queued commands 81' within the storage schedulers 48(1), 48(2), 48(3) for the virtual disks 40(1), 40(2), 40(3) assigned to that group 82(*a*), although the submit count 88(*a*) may be higher if there were previously any additional queued commands 81' within storage schedulers 48(1), 48(2), 48(3) which have already been processed by drivers 46(1), 46(2), 46(3).

Similarly, user group 82(*b*) has its pending count 90(*b*) equal to two since there are two queued commands 81 within the front-end queues 80(4), 80(5) of that group 82(*b*). User group 82(*b*) also has a submit count 88(*b*) of at least four, since there are currently four queued commands 81' within the storage schedulers 48(4), 48(5) for the virtual disks 40(4), 40(5) assigned to that group 82(*b*), although the submit count 88(*b*) may be higher if there were previously any additional queued commands 81' within storage schedulers 48(4), 48(5) which have already been processed by drivers 46(4), 46(5).

Similarly, user group 82(*n*) has its pending count 90(*n*) equal to zero since there are no queued commands 81 within the front-end queue 80(*m*) of that group 82(*n*). User group 82(*n*) also has a submit count 88(*n*) of at least two, since there are currently two queued commands 81' within the storage scheduler 48(*m*) for the virtual disk 40(*m*) assigned to that group 82(*n*), although the submit count 88(*n*) may be higher if there were previously any additional queued commands 81' within storage scheduler 48(*m*) which have already been processed by driver 46(*m*).

Figure 3:
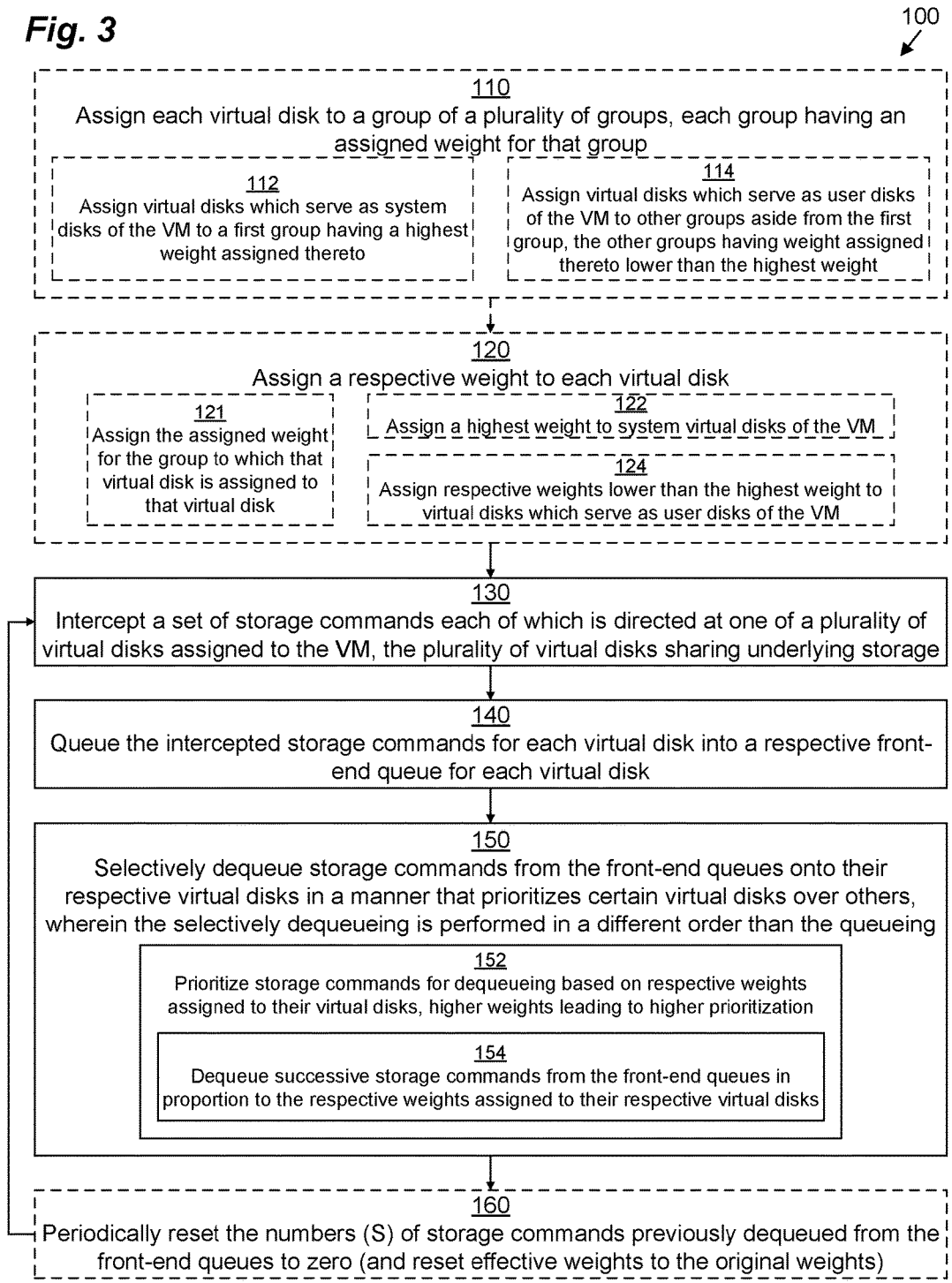
FIG. 3 is a flowchart depicting example methods for use in connection with various embodiments.
Figure 4:
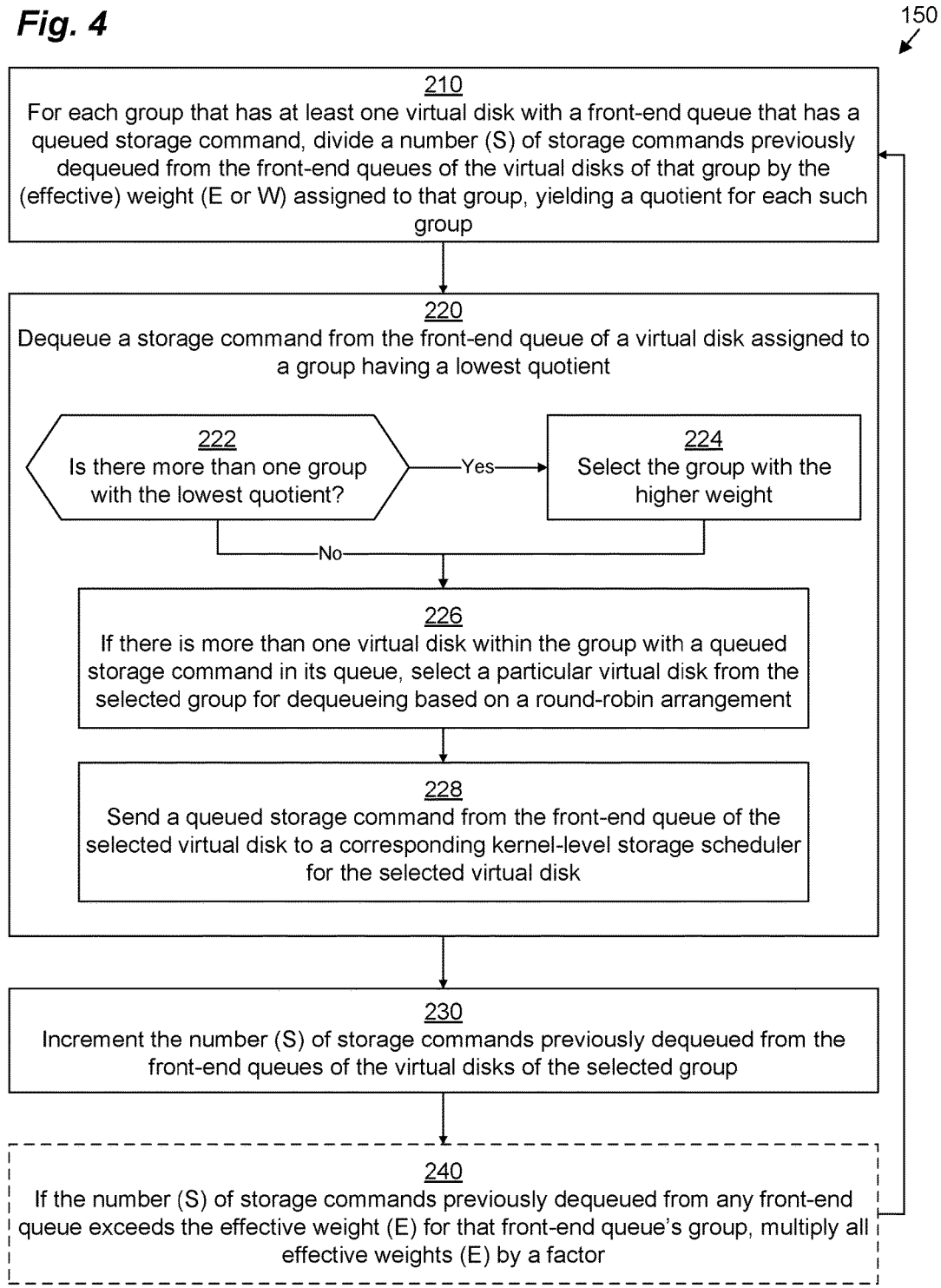
FIG. 4 is a flowchart depicting example methods for use in connection with various embodiments.

FIG. 3 illustrates an example method 100 performed by FIOS 56. It should be understood that any time a piece of software (e.g., FIOS 56; any of its component modules 92, 94; storage application 54; etc.) is described as performing a method, process, step, or function, in actuality what is meant is that a computing device (e.g., VM server 32) on which that piece of software is running performs the method, process, step, or function when executing that piece of software on its processing circuitry 72.

It should be understood that, within FIG. 3, various steps and sub-steps are dashed because they may be optional and not fundamental to method 100. However, it should be understood that, in some embodiments, one or more of the other steps or sub-steps may also be omitted. Similarly, in some embodiments, one or more steps or sub-steps may be combined together or performed in a different order. Method 100 is performed by FIOS 56, more specifically by processing circuitry 72 of VM server 32 in conjunction with various other system components.

In optional step 110, configuration engine 92 assigns each virtual disk 40 to a group 82 of a plurality of groups 82, each group 82(y) having an assigned weight 84 for that group 82(y). Step 110 is considered optional because, in some embodiments (not depicted), groups 82 may not be used, each virtual disk 40 having its own assigned weight or no weight assignment at all.

In some embodiments, step 110 may be performed by performing sub-steps 112 and 114 in parallel. In sub-step 112, configuration engine 92 assigns virtual disks 40 which serve as system disks (e.g., system virtual disks 40(1), 40(2), 40(3)) of the VM 38 to a first group 82(a) having a highest weight 84(a) assigned thereto. In parallel, in step 114, configuration engine 92 assigns virtual disks 40 which serve as user disks (e.g., user virtual disks 40(4), 40(5), 40(m)) of the VM 38 to other groups 82 (e.g., user groups 82(b), . . . , 82(n)) aside from the first group 82(a), the other groups 82(b), . . . , 82(n) having respective weights 84 assigned thereto lower than the highest weight 84(a). Thus, for example, in the configuration of FIG. 2, weight 84(a) for system group 82(a) may be set to 500, while weight 84(b) for user group 82(b) may be set to 100 and weight 84(n) for user group 82(n) may be set to 75.

In optional step 120, configuration engine 92 assigns a respective weight to each virtual disk 40. Step 120 is considered optional because, in some embodiments (not depicted), no weight assignments are used at all, all virtual disks having essentially equal priority.

In embodiments in which step 110 was performed, step 120 is performed by performing sub-step 121. In sub-step 121, for each virtual disk 40(x), configuration engine 92 assigns the assigned weight 84(y) for the group 82(y) to which that virtual disk 40(x) is assigned to that virtual disk 40(x). In some embodiments, the assignment of sub-step 121 may be done implicitly, all virtual disks 40 implicitly having a weight equal to the weight 84 of their assigned groups 82.

In other embodiments, step 120 is performed by performing sub-steps 122 and 124 in parallel. In sub-step 122, configuration engine 92 assigns a highest weight to virtual disks 40 which serve as system disks (e.g., system virtual disks 40(1), 40(2), 40(3)) of the VM 38. In parallel, in step 124, configuration engine 92 assigns respective weights lower than the highest weight to virtual disks 40 which serve as user disks (e.g., user virtual disks 40(4), 40(5), 40(m)) of the VM 38.

In step 130, I/O prioritization engine 94 intercepts a set of storage commands 52(a) each of which is directed at one of a plurality of virtual disks 40 assigned to the VM 38, the plurality of virtual disks 40 sharing underlying storage (e.g., on disks 42 and/or RAID groups 44). Typically, I/O prioritization engine 94 intercepts a storage command 52(a) being sent from storage application 54 to a virtual disk 40(x) prior to the storage commands 52(a) reaching a kernel-level storage scheduler 48(x) (i.e., within kernel space 58) for the appropriate virtual disk 40(x). I/O prioritization engine 94 itself may execute within user space 60 or within kernel space 58, depending on the embodiment.

In step 140, I/O prioritization engine 94 queues the intercepted storage commands 52(a) for each virtual disk 40(x) into a respective front-end queue 80(x) for each virtual disk 40(x). Thus, a queued command 81 is added to a front-end queue 80(x). In embodiments in which a pending count 90 is maintained on a group level, at this point, the pending count 90(y) for the group 82(y) containing the front-end queue 80(x) is incremented (P++).

In step 150, I/O prioritization engine 94 selectively dequeues queued storage commands 81 from the front-end queues 80 onto their respective virtual disks 40 in a manner that prioritizes certain virtual disks 40 over others, wherein the selectively dequeueing of step 150 is performed in a different order than the queueing of step 140. In one embodiment, step 150 is performed by performing sub-step 152. In sub-step 152, I/O prioritization engine 94 prioritizes queued storage commands 81 for dequeueing based on respective weights 84 assigned to their virtual disks 40, higher weights 84 leading to higher prioritization. In one embodiment, sub-step 152 is performed by performing sub-sub-step 154. In sub-sub-step 154, I/O prioritization engine 94 dequeues successive queued storage commands from the front-end queues 80 in proportion to the respective weights 84 assigned to their respective virtual disks 40. Thus, for example, I/O prioritization engine 94 may cycle through the various groups 82, dequeueing a queued command 81 from the end (e.g., in a FIFO manner) of a front-end queue 80 from each group 82 cycled through, such that the cycling through hits each group 82 in proportion to its assigned weight 84 compared to the assigned weights 84 of other groups 82 having pending queued commands 81 in their front-end queues 80.

Sub-step 152 (and sub-sub-step 154) describes an example embodiment of step 150 using a particular paradigm. FIG. 4 depicts an example embodiment of step 150 (also described as method 150) using a different paradigm (although it may overlap with the paradigm of sub-step 152). It should be understood that, within FIG. 4, step 240 is dashed because it may be optional and not fundamental to method 150. However, it should be understood that, in some embodiments, one or more of the other steps or sub-steps may also be omitted. Similarly, in some embodiments, one or more steps or sub-steps may be combined together or performed in a different order. Method 150 is performed by I/O prioritization engine 94, more specifically by processing circuitry 72 of VM server 32 in conjunction with various other system components.

In step 210, for each group 82(y) that has at least one virtual disk 40(x) with a front-end queue 80(x) that has a queued storage command 81, I/O prioritization engine 94 divides a number 88(y) (the submit count S) of storage commands 81 previously dequeued from the front-end queues 80 of the virtual disks 40 of that group 82(y) by the weight W 84(y) assigned to that group 82(y), yielding a quotient for each such group 82(y). In some embodiments, instead of dividing S by W, I/O prioritization engine 94 divides S by the effective weight E 86(y) to that group 82(y). These embodiments will often be the same, but once the submit count S 88 equals (or, in other embodiments, exceeds) the weight W 84 within any group 82, the effective weight E 86 will be larger than the weight W 84 (at least until it is reset, see step 160).

In step 220, I/O prioritization engine 94 dequeues a queued storage command 81 from the front-end queue 80(x) of a virtual disk 40(x) assigned to a group 82(y) having a lowest quotient (calculated in step 210). Step 220 may be performed by performing sub-steps 222-228.

In sub-step 222, I/O prioritization engine 94 determines whether or not more than one group 82 (which has a front-end queue 80(x) having at least one queued command 81) has the same lowest quotient. If yes, operation proceeds with sub-step 224 in which I/O prioritization engine 94 selects the group 82(y) having the higher weight W 84(y). Otherwise (not depicted), I/O prioritization engine 94 selects the one group 82(y) with that lowest quotient.

Either way, operation proceeds with sub-step 226. In sub-step 226, if there is more than one virtual disk 40 within the selected group 82(*y*) with a queued storage command 81 in its front-end queue 80, I/O prioritization engine 94 selects a particular virtual disk 40(*x*) from the selected group 82(*y*) for dequeueing based on a round-robin arrangement. Thus, for example, referring to FIG. 2, if the selected group 82(*y*) is system group 82(*a*), then one of the front-end queues 80(1), 80(2), 80(3) is selected (e.g., 80(1)), and the next time system group 82(*a*) is selected again in step 220, a different front-end queue 80(1), 80(2), 80(3) is selected (e.g., 80(2)), and the next time yet another (e.g., 80(3)), cycling between the front-end queues 80(1), 80(2), 80(3) having pending queued commands 81 in them. Of course if there is only one virtual disk 40(*x*) within the selected group 82(*y*) with a queued storage command 81 in its front-end queue 80(*x*), then that front-end queue 80(*x*) is selected in sub-step 226 without need for a round robin arrangement.

Upon selecting the front-end queue 80(*x*) for dequeuing in sub-step 226, I/O prioritization engine 94 performs sub-step 228 in which it sends a queued storage command 81 from the selected front-end queue 80(*x*) down to the corresponding storage scheduler 48(*x*) to ultimately be processed by driver 46(*x*) with reference to virtual disk 40(*x*) in a manner to be scheduled by the storage scheduler 48(*x*). Sub-step 228 typically involves removing the oldest queued command 81 from the selected front-end queue 80(*x*) and sending it to become the newest queued command 81' in back-end queue 85 of storage scheduler 48(*x*) (although, in the case of CFQ storage scheduler 48(1), it may instead be sent to a per-process queue 83 prior to being placed onto the back-end queue 85.

Once the queued command 81 is dequeued from the selected front-end queue 80(*x*), I/O prioritization engine 94 performs step 230, incrementing (S++) the submit count (S) 88(*y*) of the selected group 82(*y*) and decrementing (P−−) the pending count (P) 90(*y*) of the selected group 82(*y*). This pending count (P) 90 may be used in step 210 to decide which groups 82 have any pending queued commands 81 (i.e., when P>0).

In some embodiments, I/O prioritization engine 94 then performs optional step 240. In step 240, if the submit count (S) 88 of any group 82 now equals (or, in other embodiments, exceeds) the effective weight (E) 86 of that group, then I/O prioritization engine 94 multiplies the effective weight (E) 86 of every group 82 by a factor. For example, in one embodiment, the effective weight (E) 86 may always be doubled (i.e., multiplied by a factor of 2) every time this is necessary.

Upon concluding step 240 (or step 230 in embodiments in which step 240 is not performed), operation may loop back to step 210. Depending on the embodiment, this looping may continue either until there are no longer any pending queued commands 81 in any front-end queue 80 or until a timer expires (e.g., looping may continue for up to 25 or 50 ms, for example).

Returning to FIG. 3, after step 150 completes, I/O prioritization engine 94 may perform optional step 160 in some embodiments. In step 160, I/O prioritization engine 94 periodically resets the submit count (S) to zero. In embodiments in which effective weights E 86 are used in step 220, I/O prioritization engine 94 also resets the effective weights E 86 of all groups 82 to be equal to the respective weight (W) for that group 82. In some embodiments, step 160 may be performed with a periodicity of 3 seconds (i.e., 3000 ms).

Subsequently, operation may loop back to step 130.

Thus, techniques have been presented for scheduling storage commands 52(*a*) to different virtual disks 40 within a single VM 38 that share underlying storage (e.g., disks 42 or RAID group 44) in a manner that effectively reduces resource contention. This may be done by implementing a front-end storage scheduler FIOS 56 for the entire VM 38 that dequeues storage commands 81 between the various virtual disks 40 in a scheduled manner. In some embodiments, this scheme allows weighted prioritization of storage commands 52(*a*) aimed at particular virtual disks 40 or groups 82 of virtual disks 40.

While various embodiments of the present disclosure have been particularly shown and described, it will be understood by those skilled in the art that various changes in form and details may be made therein without departing from the spirit and scope of the present disclosure as defined by the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

It should be understood that all embodiments that have been described may be combined in all possible combinations with each other, except to the extent that such combinations have been explicitly excluded.

Finally, even if a technique, method, apparatus, or other concept is specifically labeled as "background" or "conventional," Applicant makes no admission that such technique, method, apparatus, or other concept is actually prior art under 35 U.S.C. § 102 or 35 U.S.C. § 103, such determination being a legal determination that depends upon many factors, not all of which are known to Applicant at this time.

What is claimed is:

1. A method of scheduling storage commands for processing on a virtual machine (VM) operating on a computing device, the method comprising:
   intercepting, by a front end storage scheduler module running in user space of the VM, a set of storage commands each of which is directed at one of a plurality of virtual disks assigned to the VM, the plurality of virtual disks sharing underlying storage;
   queuing, by the front end storage scheduler module, the intercepted storage commands for each virtual disk into a respective front-end queue of the front end storage scheduler module for each virtual disk; and
   selectively de-queuing storage commands from the front-end queues onto their respective virtual disks in a manner that prioritizes certain virtual disks over others, wherein the selectively de-queuing is performed in a different order than the queuing, wherein the de-queued storage commands are further en-queued to corresponding back-end queues of corresponding back end storage scheduler modules running in kernel space of the VM;
   executing, by a respective storage driver of each respective virtual disk running in kernel space, a storage command that is de-queued from a corresponding back-end queue by a corresponding back end storage scheduler module of the respective virtual disk.

2. The method of claim 1 wherein:
   the method further comprises assigning a respective weight to each virtual disk; and selectively de-queuing includes prioritizing storage commands for de-queuing based on respective weights assigned to their virtual disks, higher weights leading to higher prioritization.

3. The method of claim 2 wherein:

the method further comprises assigning each virtual disk to a group of a plurality of groups, each group having an assigned weight for that group; and assigning the respective weight to each virtual disk includes assigning the assigned weight for the group to which that virtual disk is assigned to that virtual disk.

4. The method of claim 3 wherein assigning each virtual disk to the group of the plurality of groups includes:

assigning virtual disks which serve as system disks of the VM to a first group having a highest weight assigned thereto; and assigning virtual disks which serve as user disks of the VM to other groups aside from the first group, the other groups having weight assigned thereto lower than the highest weight.

5. The method of claim 3 wherein selectively de-queuing includes:

for each group that has at least one virtual disk with a front-end queue that has a queued storage command; dividing a number of storage commands previously de-queuing from the front-end queues of the virtual disks of that group by the weight assigned to that group, yielding a quotient for each such group; and de-queuing a storage command from the front-end queue of a virtual disk assigned to a group having a lowest quotient.

6. The method of claim 5 wherein de-queuing the storage command from the front-end queue of the virtual disk assigned to the group having the lowest quotient includes:

determining that more than one groups share the lowest quotient; and in response to determining that the plurality of groups share the lowest quotient, selecting a group from the more than one groups having a highest weight assigned to that group.

7. The method of claim 5 wherein de-queuing the storage command from the front-end queue of the virtual disk assigned to the group having the lowest quotient includes selecting a particular virtual disk from the group for de-queuing based on a round-robin arrangement.

8. The method of claim 5 wherein the method further comprises periodically resetting the numbers of storage commands previously de-queued from the front-end queues to zero.

9. The method of claim 2 wherein assigning the respective weight to each virtual disk includes:

assigning a highest weight to virtual disks which serve as system disks of the VM; and assigning respective weights lower than the highest weight to virtual disks which serve as user disks of the VM.

10. The method of claim 2 wherein prioritizing storage commands for de-queuing based on their respective assigned weights includes de-queuing successive storage commands from the front-end queues in proportion to the respective weights assigned to their respective virtual disks.

11. An apparatus comprising:

networking circuitry for communicating with a network; and processing circuitry couple to memory configured to operate a virtual machine (VM) and to schedule storage commands for processing by:

intercepting, by a front end storage scheduler module running in user space of the VM, a set of storage commands each of which is directed at one of a plurality of virtual disks assigned to the VM, the plurality of virtual disks sharing underlying storage;

queuing, by the front end storage scheduler module, the intercepted storage commands for each virtual disk into a respective front-end queue of the front end storage scheduler module for each virtual disk; and selectively de-queuing storage commands from the front-end queues onto their respective virtual disks in a manner that prioritizes certain virtual disks over others, wherein the selectively de-queuing is performed in a different order than the queuing, wherein the de-queued storage commands are further en-queued to corresponding back-end queues of corresponding back end storage scheduler modules running in kernel space of the VM;

executing, by a respective storage driver of each respective virtual disk at the kernel space, a storage command that is de-queued from a corresponding back-end queue by a corresponding back end storage scheduler module of the respective virtual disk.

12. A computer program product comprising a non-transitory computer-readable storage medium storing a set of instructions, which, when performed by a computing device, causes the computing device to schedule storage commands for processing on a virtual machine (VM) operating on the computing device by:

intercepting, by a front end storage scheduler module running in user space of the VM, a set of storage commands each of which is directed at one of a plurality of virtual disks assigned to the VM, the plurality of virtual disks sharing underlying storage;

queuing, by the front end storage scheduler module, the intercepted storage commands for each virtual disk into a respective front-end queue of the front end storage scheduler module for each virtual disk; and selectively de-queuing storage commands from the front-end queues onto their respective virtual disks in a manner that prioritizes certain virtual disks over others, wherein the selectively de-queuing is performed in a different order than the queuing, wherein the de-queued storage commands are further en-queued to corresponding back-end queues of corresponding back end storage scheduler modules running in kernel space of the VM;

executing, by a respective storage driver of each respective virtual disk at the kernel space, a storage command that is de-queued from a corresponding back-end queue by a corresponding back end storage scheduler module of the respective virtual disk.

* * * * *

UNITED STATES PATENT AND TRADEMARK OFFICE
CERTIFICATE OF CORRECTION

PATENT NO. : 10,146,574 B1
APPLICATION NO. : 15/195447
DATED : December 4, 2018
INVENTOR(S) : Dmitry Vladimirovich Krivenok, Yuri A. Stotski and Derek M. Scott It is certified that error appears in the above-identified patent and that said Letters Patent is hereby corrected as shown below:

In the Claims

Column 10, Claim 1, Line 50, "scheduler module for each virtual disk; and" should read -- scheduler module for each virtual disk; --

Column 10, Claim 1, Line 59, "the VM;" should read -- the VM; and --

Column 11, Claim 5, Line 26, "de-queuing from the front-end queues of the virtual" should read -- de-queued from the front-end queues of the virtual --

Column 11, Claim 6, Line 35, "determining that more than one groups share the lowest" should read -- determining that at least two groups share the lowest --

Column 11, Claim 6, Line 37, "in response to determining that the plurality of groups" should read -- in response to determining that the at least two groups --

Column 11, Claim 6, Line 39, "more than one groups having a highest weight assigned" should read -- at least two groups having a highest weight assigned --

Column 12, Claim 11, Line 4, "processing circuitry couple to memory configured to" should read -- processing circuitry coupled to memory configured to --

Column 12, Claim 11, Line 15, "storage scheduler module for each virtual disk; and" should read -- storage scheduler module for each virtual disk; --

Column 12, Claim 11, Line 24, "ning in kernel space of the VM;" should read -- ning in kernel space of the VM; and --

Column 12, Claim 11, Line 26, "respective virtual disk at the kernel space, a storage" should read -- respective virtual disk running in the kernel space, a storage --

Signed and Sealed this
Twenty-sixth Day of March, 2019

Andrei Iancu
*Director of the United States Patent and Trademark Office*

CERTIFICATE OF CORRECTION (continued)
U.S. Pat. No. 10,146,574 B1

Column 12, Claim 12, Line 44, "scheduler module for each virtual disk; and" should read -- scheduler module for each virtual disk; --

Column 12, Claim 12, Line 53, "the VM;" should read -- the VM; and --

Column 12, Claim 12, Line 55, "tive virtual disk at the kernel space, a storage command" should read -- tive virtual disk running in the kernel space, a storage command --